US011023259B2

(12) United States Patent
Gupta et al.

(10) Patent No.: US 11,023,259 B2
(45) Date of Patent: Jun. 1, 2021

(54) APPARATUS AND METHOD OF USER OR DEVICE BASED APPLICATION DIFFERENTIATION

(71) Applicant: Microsoft Technology Licensing, LLC, Redmond, WA (US)

(72) Inventors: Rohit Gupta, Redmond, WA (US); Dinesh Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 16/010,163

(22) Filed: Jun. 15, 2018

(65) Prior Publication Data

US 2019/0384618 A1 Dec. 19, 2019

(51) Int. Cl.
*G06F 9/445* (2018.01)

(52) U.S. Cl.
CPC ...... *G06F 9/44536* (2013.01); *G06F 9/44552* (2013.01)

(58) Field of Classification Search
CPC .......................... G06F 9/44536; G06F 9/44552
See application file for complete search history.

(56) References Cited

U.S. PATENT DOCUMENTS

| 2007/0168932 | A1* | 7/2007 | Seeger | G06F 8/34 717/105 |
| 2010/0082813 | A1* | 4/2010 | Li | H04L 67/16 709/226 |
| 2010/0333037 | A1* | 12/2010 | Pavlovski | G06F 3/0481 715/848 |
| 2018/0314621 | A1* | 11/2018 | DiTullio | H04L 67/34 |
| 2018/0373811 | A1* | 12/2018 | Fink | H04W 56/0015 |
| 2019/0306110 | A1* | 10/2019 | Davis | H04L 61/1511 |

* cited by examiner

*Primary Examiner* — Jorge A Chu Joy-Davila
(74) *Attorney, Agent, or Firm* — Arent Fox LLP

(57) ABSTRACT

The present disclosure includes methods and apparatus for executing a single binary code version of an application including an application identifier, transmitting a variable value request including the requestor identifier and the application identifier via an application programming interface to a portal, the variable value request requesting variable value information relating to the variable of the application associated with the requestor identifier, receiving a variable value response including the variable value information relating to the variable associated with the requestor identifier, wherein the variable value information identifies one of the first variable value or the second variable value, executing the first set of code to provide the first experience within the application based on the variable value information identifying the first variable value, and executing the second set of code to provide the second experience within the application based on the variable value information identifying the second variable value.

20 Claims, 9 Drawing Sheets

APPARATUS AND METHOD OF USER OR DEVICE BASED APPLICATION DIFFERENTIATION

BACKGROUND

Cloud services offer software developers numerous tools for developing, distributing, and hosting applications. Cloud services provide versatilities to software developers and allow software developers to conveniently scale their operations without significant up-front investment. For certain applications, the software developers may want to offer different application users different experiences within the applications. Conventionally, the software developers may generate a different binary for each experience. Duplicate binaries for applications may impose burdens on software developers, and improvement may be desired.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

Aspects of the present disclosure include methods of executing a single binary code version of an application including an application identifier, a first set of code for providing a first experience associated with a variable in the application, and a second set of code for providing a second experience associated with the variable in the application, wherein the first set of code is further associated with a first variable value, and the second set of code is further associated with a second variable value, obtaining a requestor identifier associated with the device or an user of the device, transmitting a variable value request including the requestor identifier and the application identifier via an application programming interface to a portal, the variable value request requesting variable value information relating to the variable of the application associated with the requestor identifier, receiving a variable value response including the variable value information relating to the variable associated with the requestor identifier, wherein the variable value information identifies one of the first variable value or the second variable value, executing the first set of code to provide the first experience within the application based on the variable value information identifying the first variable value, and executing the second set of code to provide the second experience within the application based on the variable value information identifying the second variable value.

Other aspects of the present disclosure include a device having a memory and one or more processors communicatively coupled to the memory, the one or more processors are configured to execute a single binary code version of an application including an application identifier, a first set of code for providing a first experience associated with a variable in the application, and a second set of code for providing a second experience associated with the variable in the application, wherein the first set of code is further associated with a first variable value, and the second set of code is further associated with a second variable value, obtain a requestor identifier associated with the device or an user of the device, transmit a variable value request including the requestor identifier and the application identifier via an application programming interface to a portal, the variable value request requesting variable value information relating to the variable of the application associated with the requestor identifier, receive a variable value response including the variable value information relating to the variable associated with the requestor identifier, wherein the variable value information identifies one of the first variable value or the second variable value, execute the first set of code to provide the first experience within the application based on the variable value information identifying the first variable value, and execute the second set of code to provide the second experience within the application based on the variable value information identifying the second variable value.

Some aspects of the present disclosure include a computer-readable medium having instructions stored therein that, when executed by one or more processors, cause the one or more processors to execute a single binary code version of an application including an application identifier, a first set of code for providing a first experience associated with a variable in the application, and a second set of code for providing a second experience associated with the variable in the application, wherein the first set of code is further associated with a first variable value, and the second set of code is further associated with a second variable value, obtain a requestor identifier associated with the device or an user of the device, transmit a variable value request including the requestor identifier and the application identifier via an application programming interface to a portal, the variable value request requesting variable value information relating to the variable of the application associated with the requestor identifier, receive a variable value response including the variable value information relating to the variable associated with the requestor identifier, wherein the variable value information identifies one of the first variable value or the second variable value, execute the first set of code to provide the first experience within the application based on the variable value information identifying the first variable value, and execute the second set of code to provide the second experience within the application based on the variable value information identifying the second variable value.

Aspects of the present disclosure include methods, apparatus, and computer readable medium that perform the steps of receiving flight configuration information from a developer of an application assigning a first variable value of a variable in the application to a first flight group having a first set of requestor identifiers and a second variable value of the variable to a second flight group having a second set of requestor identifiers, wherein the first variable value is associated with a first set of code executable to provide a first experience within the application and the second variable value is associated with a second set of code executable to provide a second experience within the application, generating an application identifier corresponding to the application and the flight configuration information, receiving a variable value request including a requestor identifier and a request application identifier, correlating the request application identifier to the application identifier of the application, correlating the requestor identifier to the first flight group and the first variable value or the second flight group and the second variable value based on the request application identifier correlating to the application identifier of the application, and transmitting a variable value response including variable value information identifying the first variable value or the second variable value based on a result of the correlating of the request application identifier and the requestor identifier.

The foregoing has outlined rather broadly the features and technical advantages of examples in order that the detailed description that follows may be better understood. Additional features and advantages will be described hereinafter. The conception and specific examples disclosed may be readily utilized as a basis for modifying or designing other structures for carrying out the same purposes of the present application. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
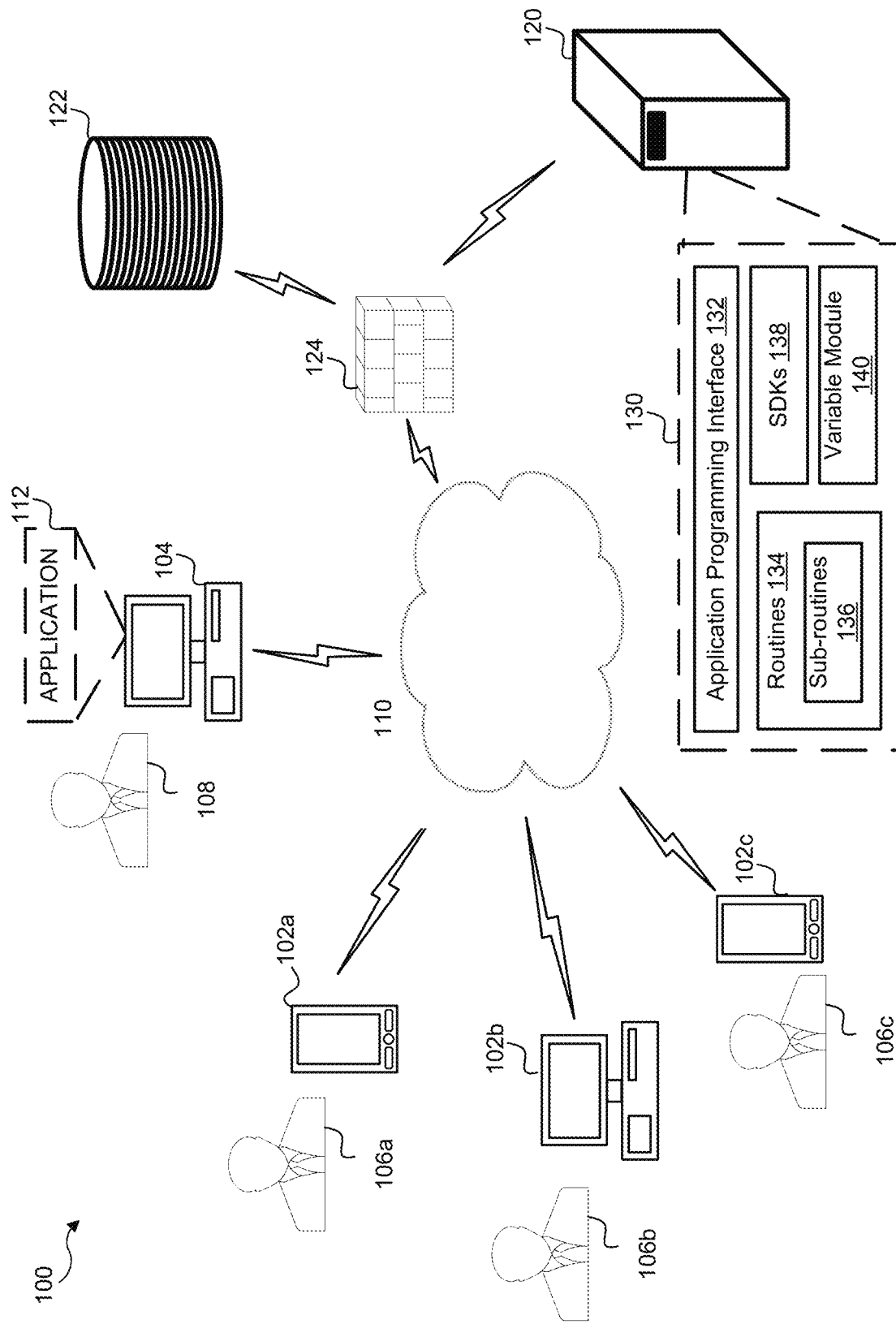
FIG. 1 is a schematic diagram of an example of an environment for managing applications.

A cloud-based portal as described herein may host a service that enables executing different sets of code for differentiated experiences in a single version of an application based on variables and variable variables configured by a software developer and associated with one or more sets of different devices or users. In some implementations, the developer may want to provide different users with different experiences as defined by different sets of instructions or code of the application. As used herein, the term "experience" with regard to an application may include features, functionality, software tools, special privileges, access to technical support, additional services and/or products, different connection speed to a network, and/or any other feature that may be provided during execution of the application via computer-readable coding or instructions. For example, but not limited hereto, in a computer game having different levels, the developer may intend to allow all users to play finished normal "levels/stages" in a computer game (e.g., levels 1-5) but only allow "beta-testers" (a sub-group of all users) to additionally play unfinished levels/stages (e.g., levels 6-7) to ascertain the entertainment value, existence of "bugs," and difficulties of the unfinished levels.

According to the present disclosure, the developer may produce only a single binary code version of an application to be distributed among all users (including the beta-testers) by the hosting portal, and include in the binary at least one variable and different variable values associated with different sets of the instructions or code that provide different experiences. Further, the developer can associate these different variable values with different users or devices to enable exposing the different experiences to the different sets of users or devices.

The service described herein generates an application identifier that uniquely identifies the application, and stores the configuration of variable(s), variable values, and associated sets of users/devices. Upon execution of the application at a device, the binary code causes the device to send a variable value request to the service, where the request includes the application identifier and a requestor identifier that identifies the device or user. The service then matches the application identifier in the request with the generated application identifier, and in response determines which variable value is associated with the user or device identified by the requestor identifier. The service may then send a variable value response back to the device, the response including variable value information that identifies which variable value, and hence which set of code and which experience, the application is authorized to execute for the device or user.

In other words, the present disclosure provides a system for transmitting one or more variable values related to the user/device identifier and an application identifier, and upon receipt, the application then decides which sets of code to execute based on the variable values being returned to show different experiences based on the variable values.

As such, the present disclosure may improve efficiencies in downloading and executing applications on devices, and in the development and coding of the applications, by replacing multiple versions of the same application with a single download that, at run-time, can operate to provide different experiences to different user or devices depending on the variable value of a variable in the application associated with each user or device.

For instance, continuing with the above computer game example, but not limited hereto, to provide varying experiences to different users, the developer may define different user groups (e.g., all users, beta-testers), define at least one variable having different variable values that correspond to different ones of the different sets of user experiences, and then may associate at least one of the user groups to one of the different variables values to enable exposing the corresponding one of the different sets of instructions or code to the identified group. For instance, but not limited hereto, for a variable "Levels" that has different values corresponding to exposure to different levels of the computer game, the developer may create or select a default flight group (e.g., "All Users") and associate it with a default variable value of "finished levels" corresponding to levels 1-5 of the computer game. Further, for the variable "Levels," the developer may create or select a beta flight group (e.g., "Beta") with a value of "unfinished_levels" corresponding to levels 1-7 of the computer game. This setting enables the members of the beta flight group to experience the finished levels of the game and the unfinished levels of the computer game. When an instance of the application, e.g., the computer game, installed on a device of a user not in the Beta flight group queries the portal (via an API), the portal may compare an identifier of the device or user with corresponding identifiers of one or more defined flight groups in order to determine which of the different experiences as defined by different sets of instructions or code of the application the device or user is enabled to access. In this case of the device of a user not in the Beta flight group, the portal may return the default variable value associated with the variable "Levels." As such, in this case, the instance of the application may, based on the default variable value, present levels 1-5 to the user. If another instance of the application installed on a device of a user defined as a beta-tester queries the portal via the API, the portal may return the variable value of unfinished_levels associated with the variable "Levels." Based on the returned variable value, in this case the instance of the application may present levels 1-7 to the beta-tester. It should be understood that the above example is one of a plurality of different implementations, and one or more variables for one or more features of an application may be associated with different sets of instructions or code of a single binary version of an application to enable the application to provide different experiences to different sets of devices or users associated with different values of the one or more variables.

In other words, the disclosure provides a state of art solution for identification of a flight group of an application at runtime. With this solution, the flight group membership of the user/device can be determined at runtime, which can be controlled independently of the binary code of the application. On a client device executing the application, when retrieving the variable values, the application will pass the user/device identity, which may be in an encrypted form, to the service. The service takes the user/device identity, decrypts it, and identifies the user and/or device. This information is then used to fetch a list of all the flight groups of which a given user/device is member. In some implementations, a user/device may be associated with one or more flight groups, with each group having its own variable value and rank. Based on operation of a highest rank matched algorithm, a highest ranked variable value associated with a highest ranked flight group is returned to the application. Thus, the application will execute a selected one or more sets of code associated with the received variable value of the variable to provide a differentiated experience in the application.

Referring now to FIG. 1, an environment 100 for managing software applications may include a first device 102a, a second device 102b, a third device 102c, and a developer device 104 connected to a server 120 and a network storage 122 through a communication network 110 and a firewall 124. A software developer 108 may develop an application 112 via a portal 130. In some examples, the portal 130 may include a platform such as the DevCenter portal hosted by Microsoft™. Specifically, the portal 130 may supply various tools such as an application programming interface (API) 132, routines 134 and subroutines 136, software development kits 138, and a variable module 140 configured to provide one or more variable values for one or more variables based on flight group configurations setup by a developer for an application. In some examples, the API 132 may offer an interface to the software developer 108 to access the routines 134, the subroutines 136, the software development kits 138, and the variable module 140. The API 132 may be a web based service. The routines 134 and subroutines 136 may include computer readable codes that implement procedures, functions, methods, and programs.

The software developer 108 may utilize the routines 134 and the subroutines 136 to construct the application 112 (such as, but not limited to, a computer game, a business productivity application, a social media application, a multimedia application, etc.). The SDKs 138 may include sets of software development tools for developing certain software. For example, the SDKs 138 may include a SDK for developing computer games, a SDK for developing productivity applications, a SDK for developing social media software, and a SDK for developing multimedia players. In certain examples, the routines 134, the subroutines 136, and the SDKs 138 may be provided by a third party server (not shown). The variable module 140 may be a service, an interface, or a software module provided by the portal 130 for the software developer 108 to manage variables and flight groups of the application 112. A flight group may be a group including users that share the same experience within the application 112. Variables may be data used to define the experiences of the flight groups, such as a name of a feature or aspect of the application that may be varied from one user or device to another. A first user 106a may use the first device 102a to download the application 112 from the server 120. A second user 106b may use the second device 102b to download the application 112 from the server 120. A third user 106c may use the third device 102c to download the application 112 from the server 120. While the software developer 108 may write the application 112 at the developer device 104 (via the portal 130), the application 112 may be hosted by the server 120 and a binary code version of the application 112 may be stored in the network storage 122, for example. In some implementations, the server 120 may include one or more physical or logical servers. The network storage 122 may include one or more physical or logical memory.

Figure 2:
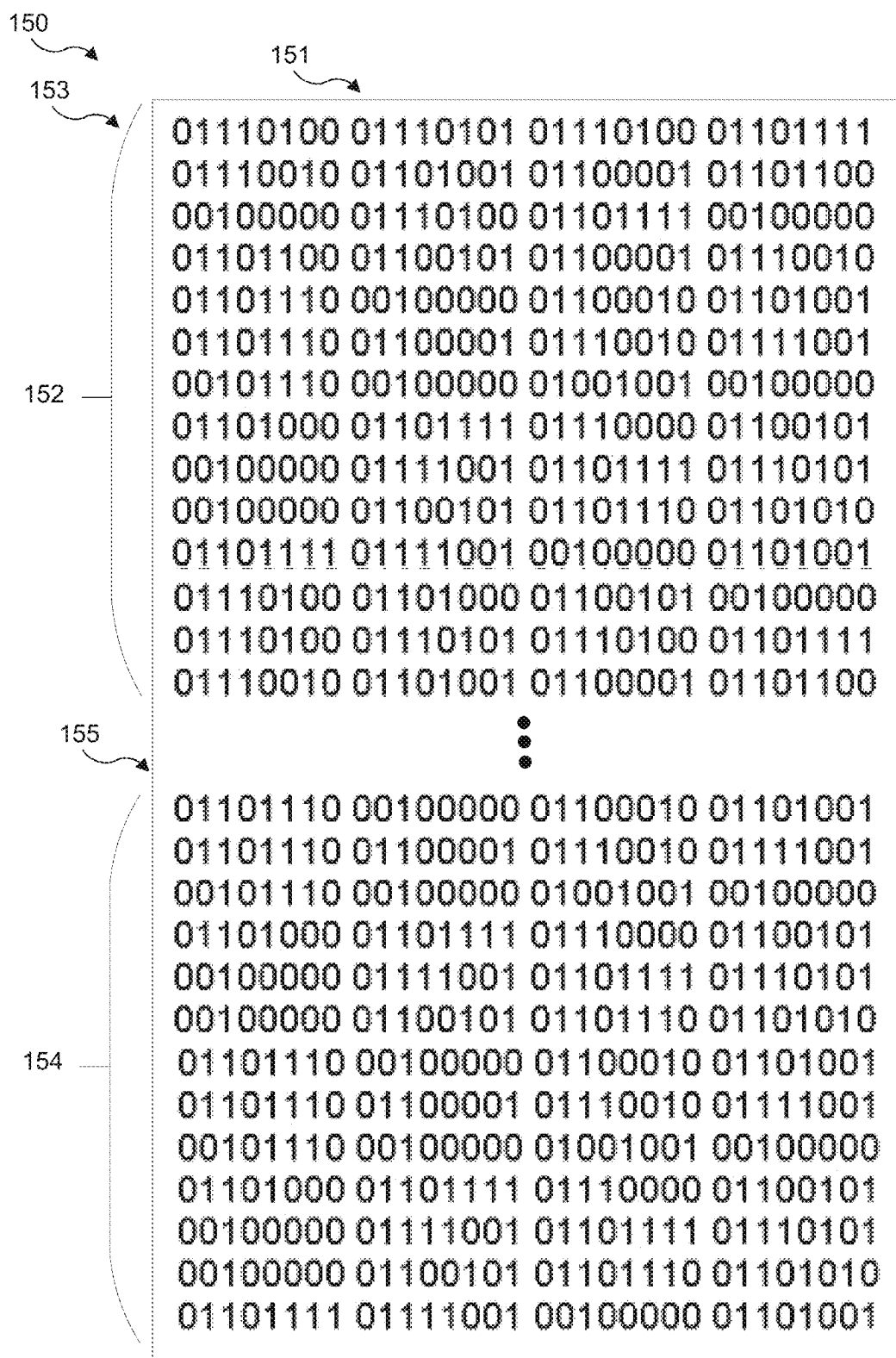
FIG. 2 is a schematic diagram of a portion of a single version of a binary code of an application having different experiences associated with different variable values of a variable within the code.

Referring to FIG. 2, in some implementations, an example of a portion of code 150 of a single binary version of the application 112 having a unique application identifier ("application ID" or "app ID") may include various experiences associated with a defined variable 151 provided by the application 112. For example, a first portion 152 of the code 150 may correspond to the first experience and a second portion 154 of the code 150 may correspond to the second experience as respectively defined by first variable value 153 and second variable value 155 of a variable 151 as set by a programmer of the application 112. Further, the first device 102a may have a first identifier associated with the first variable value, and hence the first portion 152 of the code 150, and the second device 102b may have a second identifier associated with the second variable value, and hence the second portion 152 of the code 150. In some implementations, when the first device 102a executes the code 150, the present disclosure enables the first device 102a to contact the portal 130 (FIG. 1) and identify the portion of the code 150 associated with any variable value 153, 155 of any variable 151 that may be executed by the first device 102a based on a device or user identifier being associated with a respective variable value. As such, in this case, the first device 102a may execute the first portion 152 of the code 150 to provide the first experience corresponding to the within the application 112 to the first user 106a. The first experience may include features, software tools, special privileges, access to technical support, additional services and/or products, different connection speed to the server 120, and/or any other feature that may be provided during execution of the application 112 via computer-readable coding or instructions. In a similar manner, when the second device 102b executes the code 150, the second device 102b may provide the second experience associated with the second portion 154 of the code 150 within the application 112 to the second user 106b. The second experience may include different ones of the features, software tools, special privileges, access to technical support, additional services and/or products, different connection speed to the server 120, and/or any other feature that may be provided during execution of the application 112 via computer-readable coding or instructions. It should be noted that "different" experiences may include overlapping experiences, e.g., a third experience in the above example may include both the first portion 152 and the second portion 154 of the code 150.

In other words, the present disclosure relates the first portion 152 of the code 150 to the first variable value 153 and the second portion 154 of the code 150 to the second variable value 155. For example, if the first device 102a receives the first variable value 153 from the portal 130, it may execute the first portion 152 of the code 150 but not the second portion 154 of the code 150. In another example, if the second device 102b receives the second variable value 155, it may execute the second portion 154 of the code 150 but not the first portion 152 of the code 150. Consequently, the first user 106a may be provided with the first experience based on the first device 102a executing the first portion 152 of the code 150, and the second user 106b may be provided with the second experience based on the second device 102b executing the second portion 154 of the code 150. The first variable value 153 may be associated with the first user 106a and/or the first device 102a as determined by the developer 108. Similarly, the second variable value 155 may be associated with the second user 106b and/or the second device 102b as determined by the developer 108.

Additionally, in some implementations, the code 150 may include instructions to provide different experiences to the users 106 based on the received variable values 153, 155. For example, the code 150 may include instructions indicating that, when the first device 102a receives the first variable value 153, the first device 102a will execute the first portion 152 of the code 150. The code 150 may also include instructions indicating that, when the second device 102b receives the second variable value 155 the second device 102b will execute the second portion 152 of the code 150. For example, the code 150 may include conditional statements that determine the portion of code to be executed based on the variable values. An example of conditional statements in the code 150 may be as follows:

```
If (variableValue == "DefaultValue")
{
    experiencePresented = DefaultExperience
}
Else-if (variableValue == "Value1")
{
    experiencePresented = experience1
}
Else (variableValue == "Value 2")
{
    experiencePresented = experience2
}
```

While the illustrative example above shows three conditions and three associated experiences, one skilled in the art would understand that any number of conditions and experiences may be included in the code 150.

Figure 3:
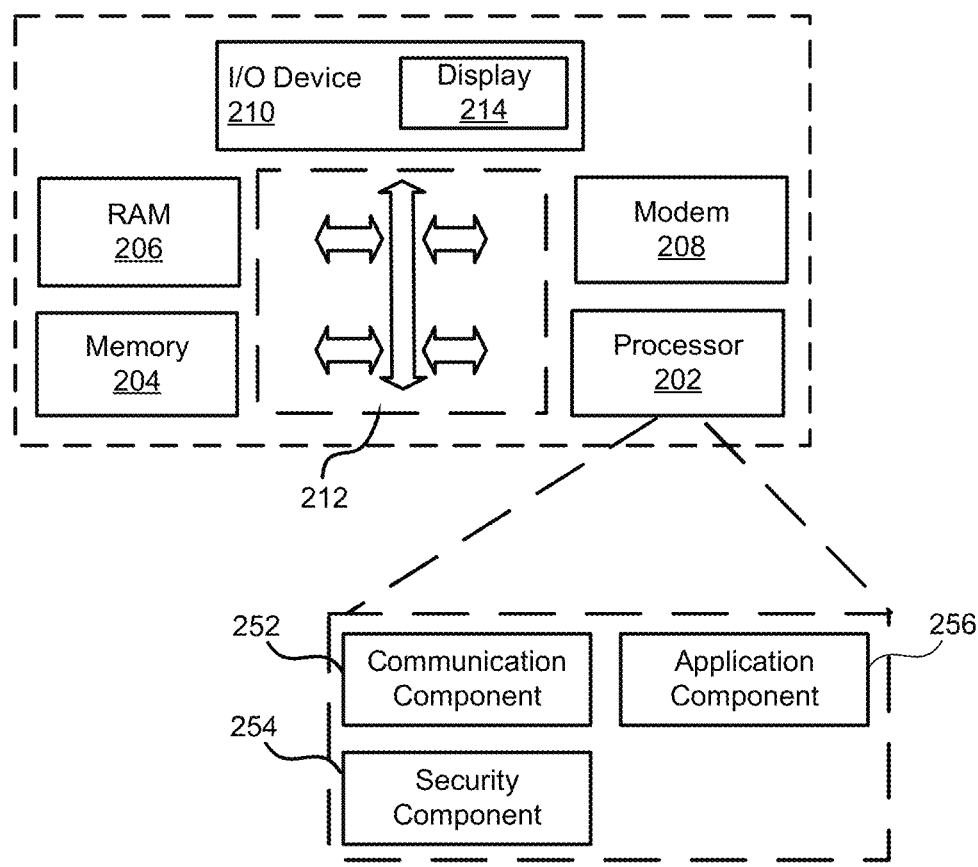
FIG. 3 is a block diagram showing an example of a device selectively delivering an experience within an application.

Referring to FIG. 3, in some implementations, the device 102 may include a processor 202 having a communication component 252 configured to communicate with the server 120 as described in this disclosure, via the communication network 110. The communication component 252 may be implemented as hardware in the processor 202 for example, as software code executed by the processor 202, or a combination thereof. The processor 202 may also include a security component 254 configured to manage, encrypt, and/or decrypt data stored on the device 102, such as security tokens. The security component 254 may be implemented as hardware in the processor 202 for example, as software code executed by the processor 202, or a combination thereof. The processor 202 further includes an application component 256 for executing the applications based on the variables received, as described throughout this disclosure. The application component 256 may be implemented as hardware in the processor 202 for example, as software code executed by the processor 202, or a combination thereof. The processor 202 may include one or more processors or cores, and may be implemented as a semiconductor processor, a field programmable gate array, a programmable logic device, a processing cluster, an application specific integrated circuit, or other suitable architectures.

The device 102 includes a memory 204. The memory may be static or dynamic memory such as flash memory, random access memory, magnetic memory, or semiconductor memory. The memory 204 may include external memory accessible via the communication network 110 such as a cloud storage. The memory 204 may include or store the application 112 and/or the code 150. The device 102 further includes a modem 208 for communicating with the server 120, and may operate in cooperation with the communication component 252. The device 102 also includes a RAM 206, such as static or dynamic random access memory (RAM). The device 102 may also include an Input/Output (I/O) device 210 connected to a display 214. The components within the device 102 may be interconnected by a bus 212.

Figure 4:
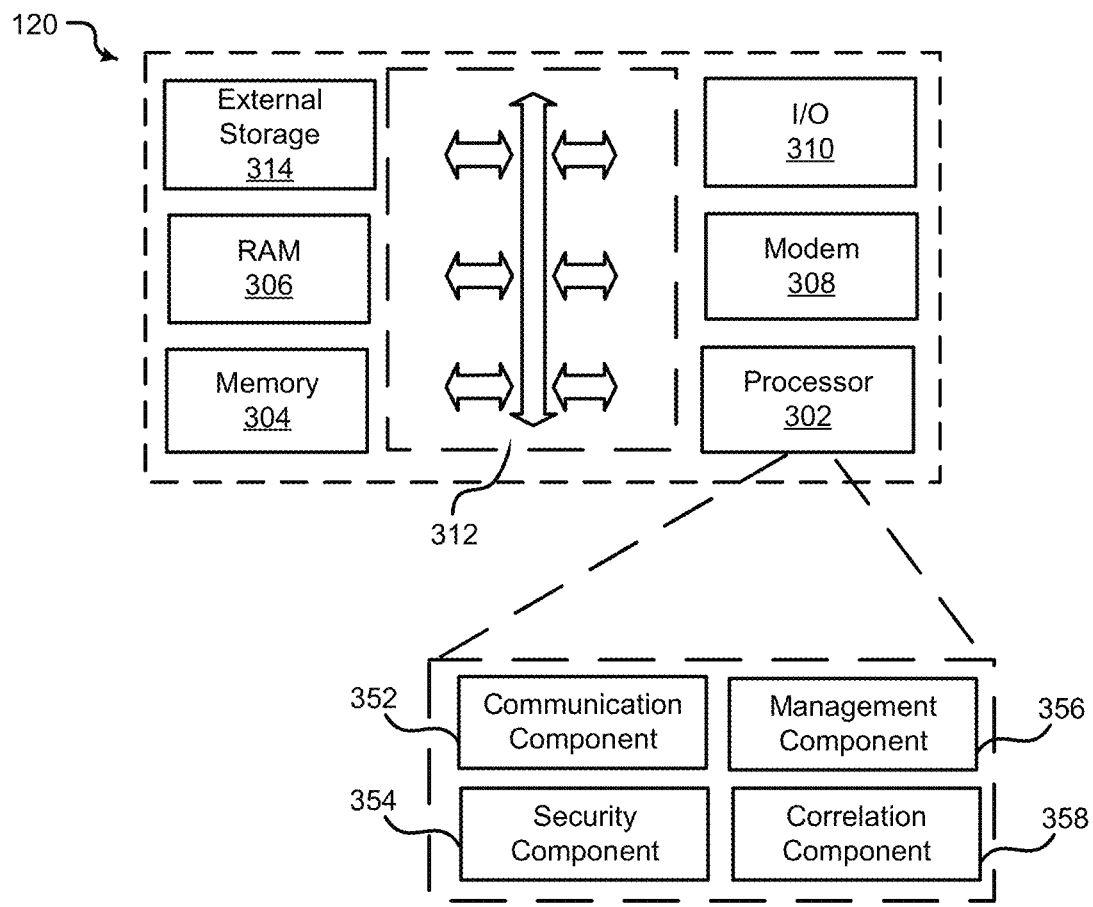
FIG. 4 is a block diagram showing an example of a portal for hosting applications and providing an indication to each device of the experience to be provided.

Referring to FIG. 4, one example of the server 120 may include a processor 302 having a communication component 352 configured to communicate with the first device 102a, the second device 102b, the third device 102c, and the developer device 104, as described in this disclosure, via the communication network 110. The communication component 352 may be implemented as hardware in the processor 302 for example, as software code executed by the processor 302, or a combination thereof. The processor 302 may also include a security component 354 configured to manage, encrypt, and/or decrypt data stored received by the server 120, such as security tokens. The security component 354 may be implemented as hardware in the processor 302 for example, as software code executed by the processor 302, or a combination thereof. The processor 302 may further include a management component 356 configured to generate and assign application identifiers to applications associated with the portal 130. The management component 356 may be implemented as hardware in the processor 302 for example, as software code executed by the processor 302, or a combination thereof. The processor 302 may further include a correlation component 358 configured to identify an application identifier and correlate the application identifier with an application, and identify a requestor identifier and correlate the requestor identifier with the flight groups and variables information of the user/device associated with the requestor identifier. The correlation component 358 may be implemented as hardware in the processor 302 for example, as software code executed by the processor 302, or a combination thereof. The processor 302 may include one or more processors or cores, and may be implemented as a semiconductor processor, a field programmable gate array, a programmable logic device, a processing cluster, an application specific integrated circuit, or other suitable architectures.

The server 120 includes a memory 304. A RAM 306, a modem 308, an I/O device 310, and a bus 312 of the server 120 may be the same as or similar to the corresponding components of the device 102, as described above, but configured or otherwise programmed for server operations, as opposed to individual device operations, as described throughout this disclosure. The modem 308 may operate in cooperation with the communication component 352. The server 120 may also include an external storage 314 such as external hard drives, backup drives, cloud storage, network drives. In some examples, a portion or all of the API 132, the routines 134 and the subroutines 136, the software development kits 138, the variable module 140, and the binary of the application 112 may be stored in the memory 304, the external storage 314, and/or the network storage 122.

Figure 5:
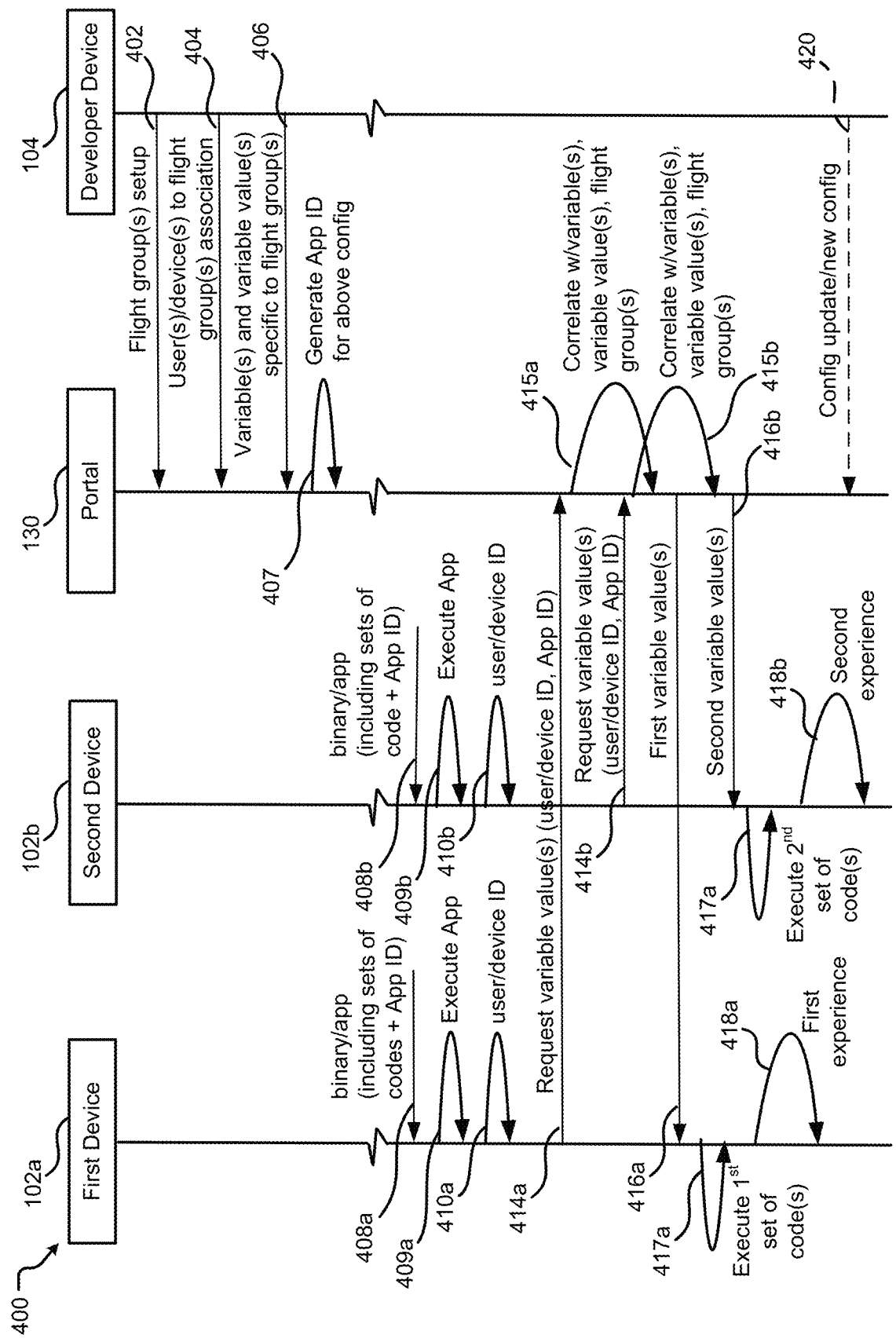
FIG. 5 is a message flow diagram of an example of a method for managing experiences by an application at run-time.

Referring now to FIG. 5, the software developer 108 may use the developer device 104 and the portal 130 to manage the application 112 (e.g., a computer game) created by the developer 108 according to one example of a message flow 400. The computer game may include, for example, nine playable levels. Levels 1-5 may be open to all users. Levels 6-7 may be open only to premium users and beta-testers. Levels 8-9 may be open only to beta-testers.

At 402, in some implementations, the developer device 104 may create at least one flight group, such as a first flight group and a second flight group. The flight groups may be associated with different flights of the users 106 and/or devices 102.

At 404, for example, the developer device 104 may assign different sets of users 106 and/or devices 102 to different flight groups. For instance, the developer device 104 may assign the first user 106a to the first flight group (e.g., PremiumUserGroup) and the second user 106b to the second flight group (e.g., BetaTesterGroup). The third user 106c may remain unassigned, or in a default flight group.

At 406, in certain examples, the developer device 104 may generate a variable (e.g., Levels), which may be some feature or experience within the application for which the developer provides different experiences, and one or more variable values (e.g., PremiumLevels and TestLevels) associated with each experience, and assign or specify a particular variable value to each flight group, e.g., the first flight group and the second flight group. It should be understood that the application may include a plurality of different variables, each having a plurality of different sets of code corresponding to a plurality of different variable values. In alternative implementations, a user may be assigned to more than one flight group.

For instance, as discussed above with reference to FIG. 2, in some implementations, a single binary code 150 version of an application 112 may include one or more variables each having a plurality of different experiences that may be dynamically executed at run-time of the application 112. As an example, the developer 108 may generate the first variable value 153 that corresponds to the first portion 152 of the code 150. The developer 108 may add the first user 106a to the first flight group. Next, the developer 108 may associate the first variable value 153 of the variable 151 to the first flight group. Since the first user 106a is part of the first flight group, the developer 108 may use the first variable value 153 to indicate that the first user 106a will be provided with the first experience.

In some implementations, a variable may be associated with one or more flight groups, with each group having its own variable value and rank. If a user/device is members of more than one flight group, the highest ranked group value will be returned.

At 407, the portal 130 may generate a unique application identifier for the application and the flight configuration defined at 402, 404, and 406. The unique application identifier may be associated with the application 112, and used by the developer 108 and/or users 106 to identify the application 112.

At 408a and 408b, the first device 102a and the second device 102b, respectively, may obtain the binary code 150 version of the application 112. In other words, the first device 102a and the second device 102b receive an identical binary code 150 version of the application 112. For example, the transmitted binary code 150 version of the application 112 may include levels 1-9, such that the single binary code 150 version of the application 112 may include all the experiences available (i.e., levels 1-9) to the users. The first device 102a and the second device 102b may obtain the binary code 150 version of the application 112 by from a third party server (not shown), a computer readable medium (e.g., hard drive, compact disc, flash memory, portable drive, network drive), or any other method.

At 409a and 409b, in some implementations, the first device 102a and the second device 102b may execute the binary code 150 version of the application 112. The executions may trigger one or more of the following steps. The executions in the first device 102a and the second device 102b may occur automatically after obtaining the binary code 150 (e.g., part of the installation process) or manually (e.g., when the users 106a, 106b open the application 112).

At 410a and 410b, in certain examples, the first device 102a may obtain or generate a first requestor identifier of the first device 102a or the first user 106a, and the second device 102b may obtain or generate a second requestor identifier of the second device 102b or the second user 106b. The requestor identifiers may include encrypted tokens to identify the first device 102a and the second device 102b, and/or the first user 106a and the second user 106b. For example, the requestor identifiers may include the media access control (MAC) addresses of the devices 102a, 102b, the username/password of the users 106a, 106b, or the email addresses of the users 106a, 106b. Examples of tokens include RPS tokens (used for Microsoft™ accounts) and AAD tokens (for Active Directory users). In other examples, each user or device may have a requestor identifier and may register the requestor identifier with the portal 130. It should be understood that acts 410a and 410b may be performed earlier in the message flow 400 or at some other time prior to the occurrence of the message flow 400. The requestor identifiers may be associated with the first and second devices 102a, 102b, and/or the first and second users 106a, 106b. In other examples, a third party server (not shown; such as a security or authentication server) may transmit a first requestor identifier to the first device 102a and a second requestor identifier to the second device 102b. In some examples, the first and second identifiers are obtained from Windows Authentication Module.

At 414a and 414b, in some implementations, the first device 102a may transmit a variable value request for variable values and the second device 102b may transmit a variable value request for variable values. In an implementation, each request may occur during a run-time of the application 112. The requests may be triggered by initiation of execution of the application, an expiration of a timer, an occurrence of an event, an occurrence of a time, or an endpoint in the binary code version of the application 112. When transmitting the requests for variables, the first device 102a and the second device 102b may transmit the first and second requestor identifiers (encrypted or decrypted) and the application identifier to the portal 130. The application identifiers may be unique numbers or values, etc., used by the portal 130 to identify the requesting application from a plurality of other applications for which the portal 130 may have flight configuration information. In some case, such as with regard to an application developer using the DevCenter available from Microsoft Corporation, the application 112 and instances of the application 112 (e.g., binary code 150 version) may be assigned a ProjectID. The ProjectID may be used as an application identifier. The requestor identifiers may be used by the portal 130 to determine the identities of the first and second users 106a, 106b and/or the first and second devices 102a, 102b. Based on the requestor identifiers received, the portal 130 may determine that the first user 106a belongs to the first flight group (i.e., PremiumUserGroup) and the second user 106b belongs to the second flight group (i.e., BetaTesterGroup). In alternative implementations, the devices 102 may transmit an application identifier, such as a ProjectID, along with the identifiers. The ProjectID may be used to identify the application 112.

At 415a and 415b, the portal 130 may correlate the variable value request from the first device 102a with the first user 106a, the first flight group, the one or more variables associated with the flight groups, and/or the first variable value, and the variable value request from the second device 102b with the first user 106b, the second flight group, the one or more variables associated with the flight groups, and/or the second variable value. For example, the portal 130 may use the content of the first requestor identifier to identify the first device 102a and/or the first user 106a to identify the first flight group and/or the first variable value associated with the first user 106a. The portal 130 may also use the content of the second requestor identifier to identify the second device 102b and/or the second user 106b to identify the second flight group and/or the second variable value associated with the second user 106b. Further, the portal 130 may use the application identifier, such as the Project ID, to identify the application 112. In some implementations, the portal 130 may first decrypt the encrypted requestor identifiers and/or application identifier to access the contents in the identifiers.

At 416a and 416b, after determining the flight groups based on the identifiers, the portal 130 may transmit the first variable value (i.e., PremiumLevels or some other value that represents this level) to the first device 102a, and the second variable value (i.e., TestLevels or some other value that represents this level) to the second device 102b. In some implementations, the portal 130 may transmit more than one variable value to a device.

At 417a, 418a and 417b, 418b, after receiving the transmitted variable value(s), the first device 102a may execute the first set of code associated with the variable to provide the first experience to the first user 106a based on the first variable value of PremiumLevels received at the first device 102a. Similarly, the second device 102b may execute the second set of code associated with the variable to provide the second experience to the second user 106b based on the second variable value of TestLevels received at the second device 102b.

At 420, in some examples, the developer 108 may use the developer device 104 to update or create additional flight configuration information subsequent to the creation of the initial configuration, such that the portal 130 retrieves the latest information for each received variable value request. In other words, the same device executing the same application at two different times may provide different experiences if the flight configuration for the user/device has been changed between the two different times. It should be noted that although 420 is illustrated as occurring after 418, it may occur at any time in flow 400. Regarding an update, for instance, the developer 108 may assign new assign the first variable value (i.e., PremiumLevels) to the first flight group (i.e., PremiumUserGroup) and the second variable value (i.e., TestLevels) to the second flight group (i.e., BetaTesterGroup). By assigning the variable values to the corresponding flight groups, the developer 108 may provide the first user 106a access to the premium levels (e.g., levels 6-7) and the second user 106b access to the test levels (e.g., levels 8-9). In certain examples, the developer 108 may use the developer device 104 to assign one or more variable values to a flight group. In some examples, the assignment may occur during the run-time of application 112 on the first device 102a and/or the second device 102b. By defining variable values and assigning the values to flight groups, the developer 108 may change the experience of the users 102 after the distribution and the installation on the device of the binary version of the application.

In some implementations, the step at 420 may update the flight groups and variable values. For example, the first device 102a may initially receive the value PremiumLevels for accessing the premium levels 6-7. Subsequently, the first device 102a may initiate a subsequent variable value request. The subsequent variable response may include a value of TestLevels to allow users in the PremiumUserGroup access the test levels 8-9 after the BetaTestGroup members completed the evaluation of the test levels 8-9.

Figure 6:
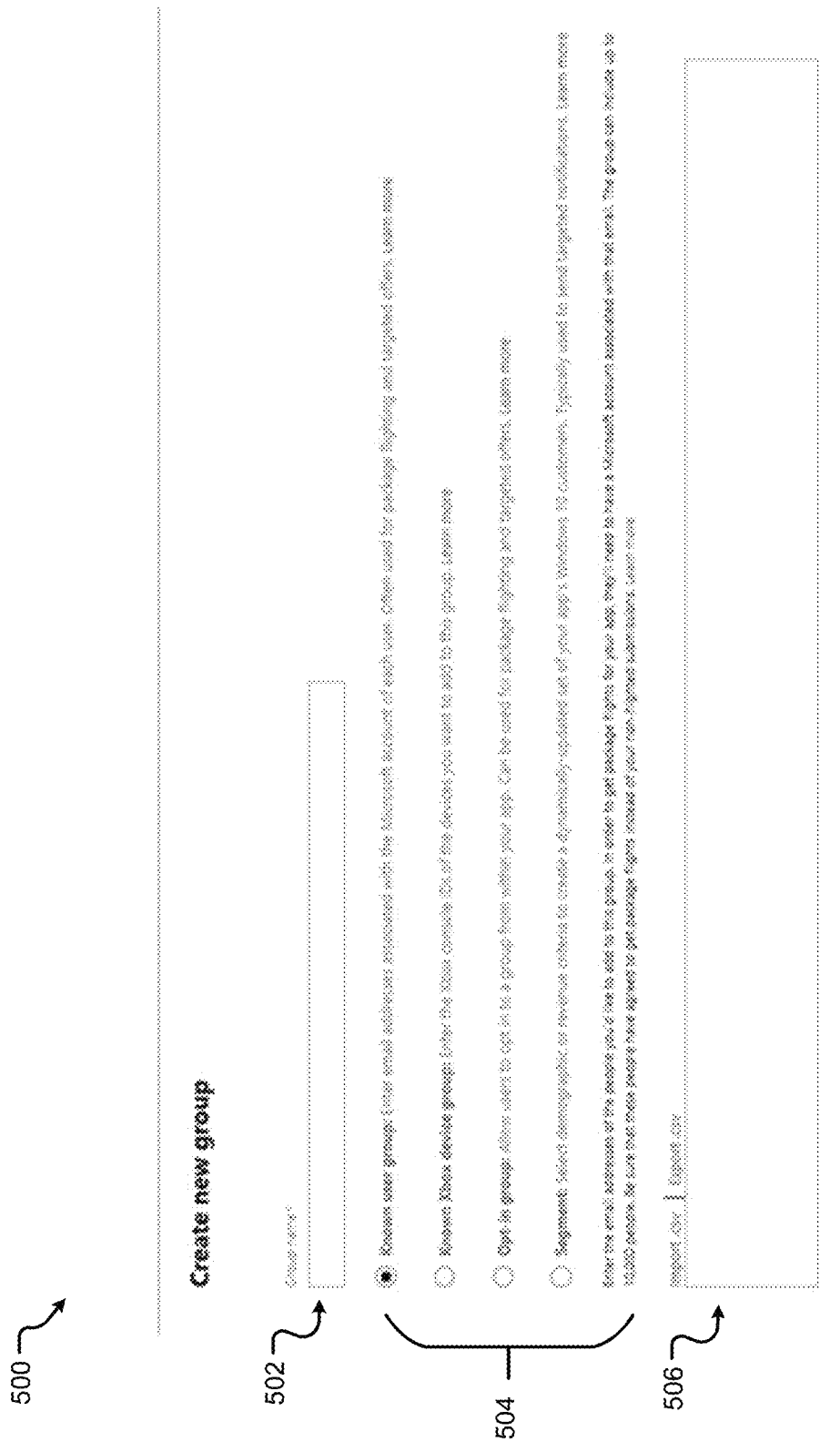
FIG. 6 is an example of a user interface for creating new groups.

Referring now to FIG. 6, an example of an interface 500 for creating new groups may include a group name input box 502 for entering the group name, a selection control 504 for choosing the type of group (e.g., known user group, opt-in group . . . ), and a group member input box 506 for entering an identifier of users or devices that belong to the new group. For example, the identifier of the user or the device may include, but is not limited to, an email address, a username/password, a social security number, an account number, etc.

Figure 7:
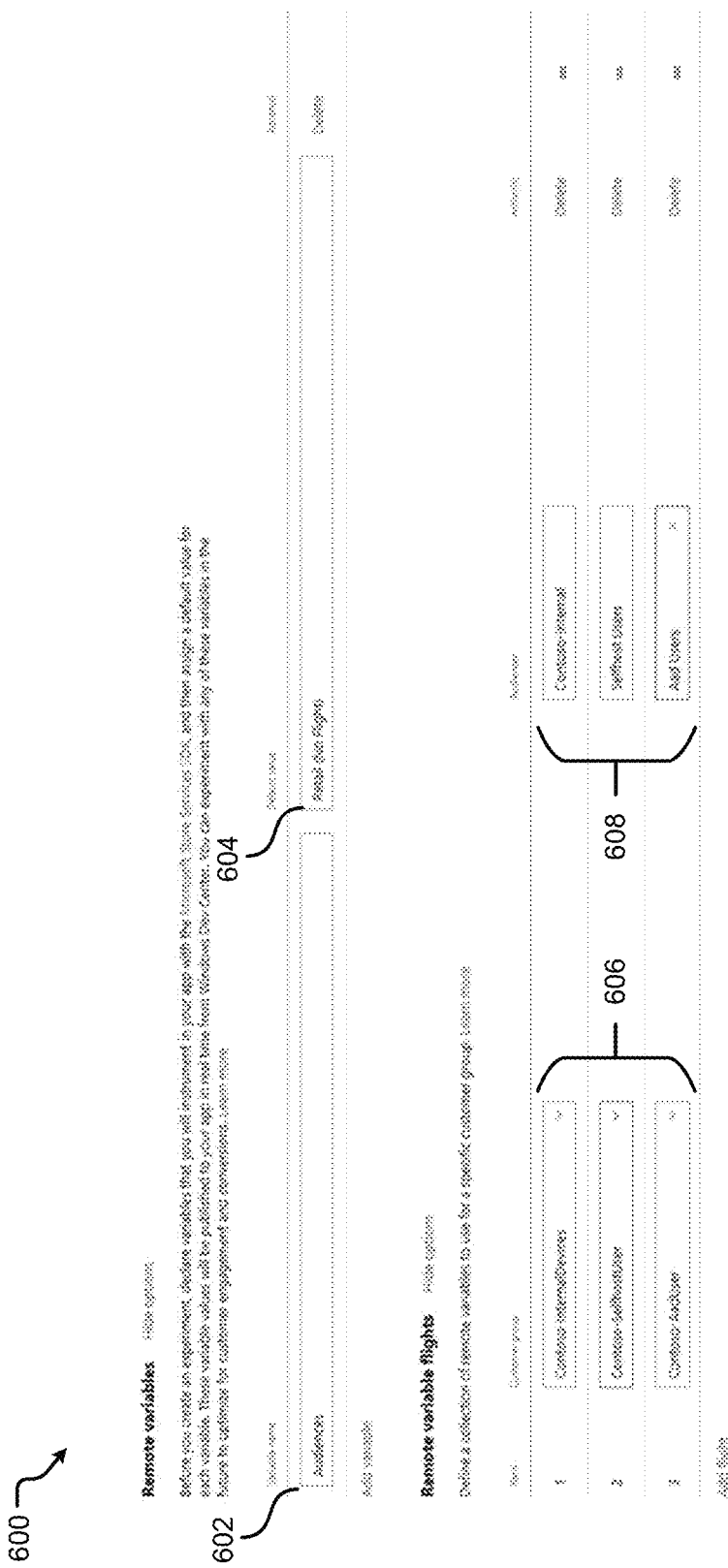
FIG. 7 is an example of an interface for managing variables and associating different groups to different variable values to define different application experiences for the different groups.

Referring now to FIG. 7, an example of an interface 600 for managing variables associated with the single binary code 150 version of the application 112, and associating variable values with groups. The interface 600 may include, but is not limited to, an input box 602 for adding new variables, an input box 604 for adding default values to a variable field, one or more flight groups 606, and input boxes 608 for assigning variable values to the variable fields of the one or more flight groups 606. In one example implementation of using the interface 600 and the interface 700, a Contoso developer create the following Customer Groups in DevCenter which identifies its user/device base for the contoso-application: Contoso-InternalDevices, Contoso-SelfhostUser, Contoso-AadUser. Once all the Customer Groups are created for which user/device identification is needed, the developer may configure Remote Variable settings in DevCenter. Each remote variable setting is associate with one or more DevCenter Customer Group. For example, the developer may create a remote variable with name 'Audience' whose default value is set to 'Retail (No Flight)'—this value will be returned when no user/device match is found. For same variable 'Audiences' other values are created, each associated with a different Customer Group. For ex. Value 'Contoso-Internal' is defined for 'Contoso-InternalDevices' group—i.e. this value will be returned by the service if the device is member of 'Contoso-InternalDevices' group. For a given variable, each Customer Group is associated with a rank—if there are multiple matching group for a given user/device, the group with lowest rank is returned. Remote Variable service runs its algorithm of querying the membership for all the passed in user and/or device and then runs the ranking algorithm to return the lowest ranked matched group's value. As part of the Remote Variable configuration, DevCenter generates a ProjectId which is used by the application to call Remote Variable REST (representational state transfer) APIs.

Figure 8:
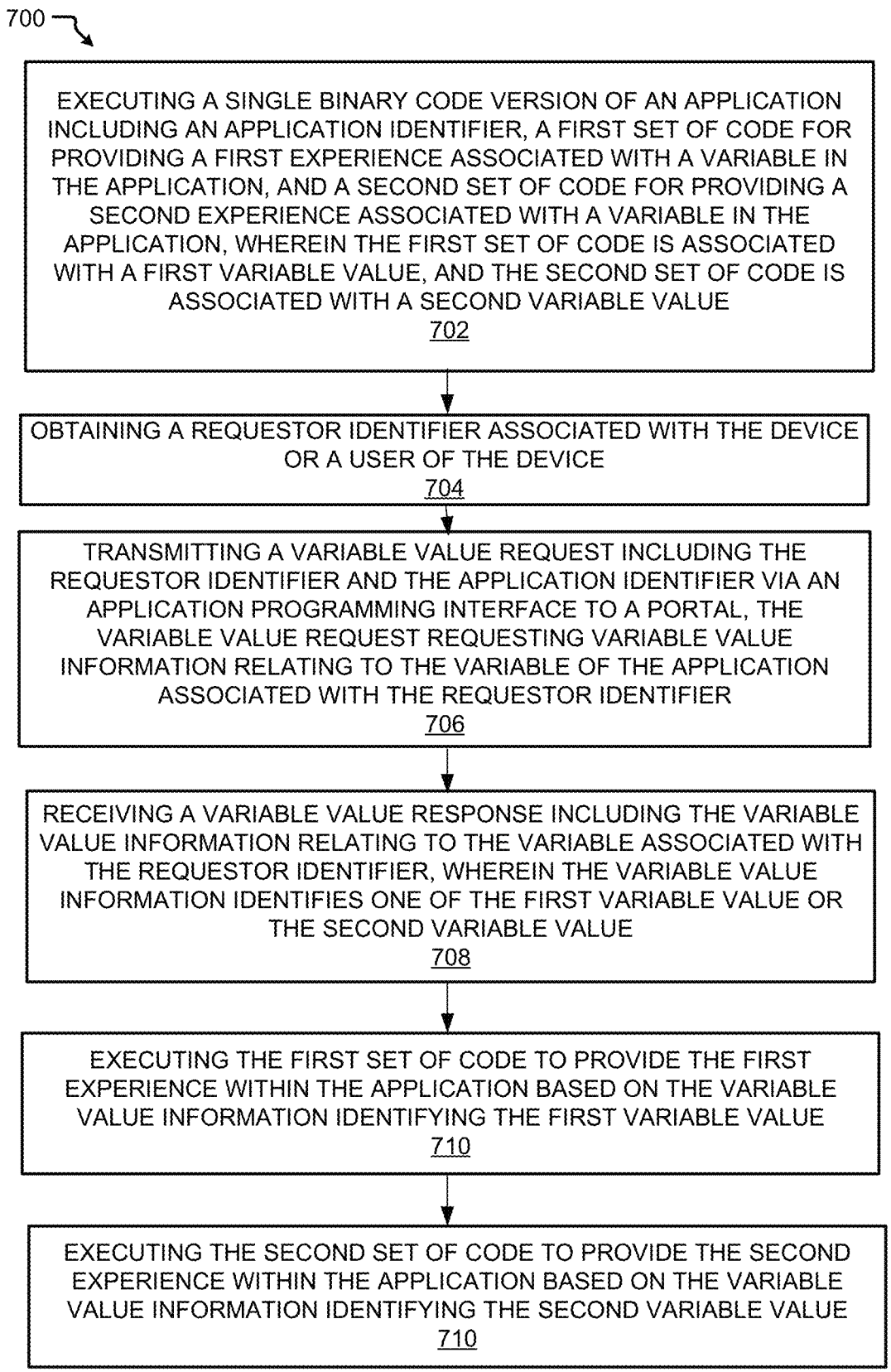
FIG. 8 is a process flow diagram of an example of a method for delivering an experience within an application.

Referring now to FIG. 8, an example of a method 700 operable at a device for delivering an experience within an application may enable a developer to determine, during run-time, the appropriate experience for the user of the device. For example, method 700 may be performed by any of the devices 102a, etc., of FIG. 1, for instance by processor 202.

At block 702, the method 700 may execute a single binary code version of an application including an application identifier, a first set of code for providing a first experience associated with a variable in the application, and a second set of code for providing a second experience associated with a variable in the application, wherein the first set of code is associated with a first variable value, and the second set of code is associated with a second variable value. For example, the communication component 252 of the first device 102a may execute the binary 150 of the application 112. The application 112 may have a unique application identifier, e.g., associated with a portal 130 that can provide variable values for variables within the application. The binary may include a first set of code for levels 6-7 (i.e., premium levels) and a second set of code for levels 8-9 (i.e., test levels). The binary may further include another set of code for levels 1-5 for all users. In some implementations, the first device 102a may rely on the modem 208 to receive packets via the communication network 110. The packets may contain bits of the binary 150.

At block 704, the method 700 may obtain a requestor identifier associated with the device or a user of the device. For example, the security component 254 of the first device 102a may obtain an identifier, such as a token, stored in memory 204. The token may be an RPS token (used for Microsoft™ accounts) or an AAD token (for Active Directory users). The token may be encrypted and include the identity of the first user 106a and/or the first device 102a. In some implementations, the identifier may include the MAC addresses of the first device 102a, the username/password of the first user 106a, and/or the email addresses of the first user 106a.

At block 706, the method 700 may transmit a variable value request including the requestor identifier and the application identifier via an application programming interface to a portal, the variable value request requesting variable value information relating to the variable of the application associated with the requestor identifier. For example, the communication component 252 of the first device 102a may transmit the variable value request requesting variable value information, via the API 132, to the portal 130 for the variable(s) associated with the identifier. In certain implementations, the variable value request may include the requestor identifier (e.g., RPS or AAD tokens) associated with the first device 102a and/or the first user 106a. Additionally, the variable value request may include the application identifier, such as the Project ID of the application 112. The Project ID may be assigned by the portal 130 prior to downloading the binary code of the application 112. The variable value request may be packaged in a number of packets in the modem 208 of the first device 102a. The modem 208 may transmit the packets containing the request to the portal 130 via the API 132 and the communication network 110. The packets may include transport information, such as Internet Protocol (IP) address of the portal 130 so the packet may be routed across the communication network 110 to the portal. The API 132 may provide an interface.

At block 708, the method 700 may receive a variable value response including the variable value information relating to the variable associated with the requestor identifier and the application identifier, wherein the variable value information identifies one of the first variable value or the second variable value. For example, the communication component 252 of the first device 102a may receive the variable value of PremiumLevels from the portal 130. The received variable value of PremiumLevels may be assigned by the developer 108 to the first flight group that includes the first user 106a, namely the PremiumUserGroup. The variable value of PremiumLevels may be carried in a number of data packets transmitted by the portal 130. The modem 208 may receive the packets transmitted across the communication network 110.

At block 710, the method 700 may execute the first set of code to provide the first experience within the application based on the variable value information identifying the first variable value. For example, the application component 256 of the first device 102a may execute the first set of code to provide levels 6-7 to the first user 106a based on the first variable value of PremiumLevels. The processor 202 may identify the first set of code associated with the PremiumLevels, and execute the first set of code by reading and executing instructions within the first set of code. Other examples of experience may include tools, privileges, features, products, services, and/or support.

At block 712, the method 700 may execute the second set of code to provide the second experience within the application based on the variable value information identifying the second variable value. For example, the application component 256 of the first device 102a may execute the second set of code to provide levels 8-9 to the first user 106a based on the second variable value of TestLevels. Other examples of experience may include tools, privileges, features, products, services, and/or support.

In some examples, differences in experience among different flight groups may include members of one group having access to software tools (e.g., import/export documents in a productivity software) while members of another group do not. In another example, the differences in experience may include the members of one group having special privileges (e.g., privileges to initiate and respond to messages) while other members do not. Alternatively, the differences in experiences may include the members of one group having access to features (e.g., better weapons in a game), products (e.g., expansion patches), services (e.g., advance tutorials), and/or support (e.g., unlimited technical support), while other members do not.

In optional implementations, the method 800 may receive an initial variable value information and execute a single binary code version of the application, followed by transmitting a subsequent variable value request and receiving a subsequent variable value response including subsequent variable value information, wherein the subsequent variable value information identifies a different variable value than the initial variable value information. For example, the first device 102a may receive the value PremiumLevels for accessing the premium levels 6-7, followed by a subsequent variable value request. The subsequent variable response may include a value of TestLevels to allow users in the PremiumUserGroup access the test levels 8-9 after the BetaTestGroup members completed the evaluation of the test levels 8-9.

Figure 9:
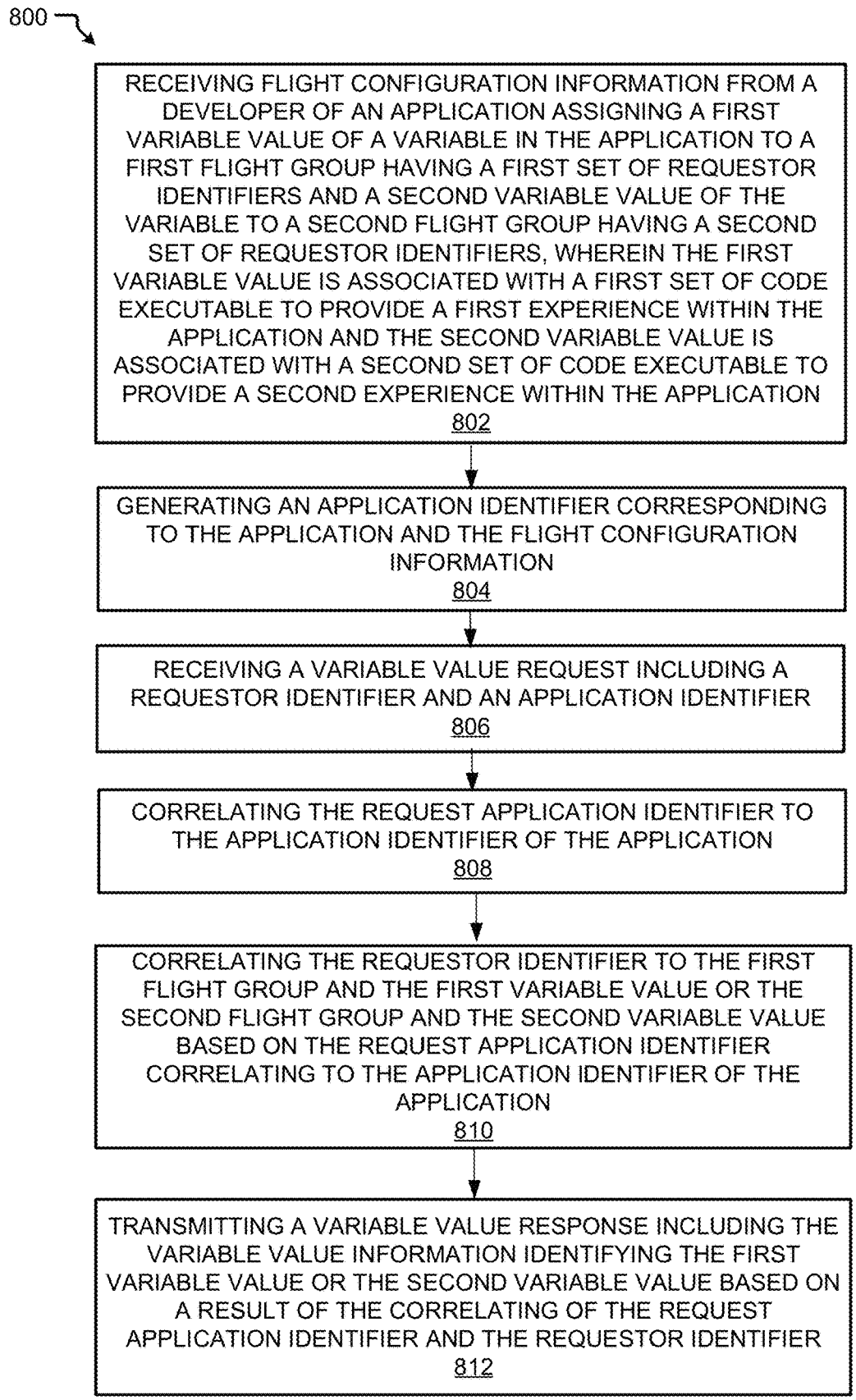
FIG. 9 is a process flow diagram of an example of a method for managing applications having dynamically determined user experiences.

Referring now to FIG. 9, an example of a method 800 operable at a server for managing applications may allow a developer to distribute the same binary to various users receiving different experiences. For example, method 800 may be performed by server 120 and/or portal 130 of FIG. 1, for instance by processor 302.

At block 802, the method 800 may receive flight configuration information from a developer of an application assigning a first variable value of a variable in the application to a first flight group having a first set of requestor identifiers and a second variable value of the variable to a second flight group having a second set of requestor identifiers, wherein the first variable value is associated with a first set of code executable to provide a first experience within the application and the second variable value is associated with a second set of code executable to provide a second experience within the application. For example, the communication component 352 may receive an indication from the developer 108 via the API 132 assigning the value PremiumLevels to the PremiumUserGroup and the value TestLevels to the BetaTesterGroup. The value of PremiumLevels may grant users in the PremiumUserGroup access to the premium levels 6-7. The TestLevels may grant users in the BetaTesterGroup access to the test levels 8-9. In certain implementations, the modem 308 may receive data packets including the indication. The modem 308 may decode the information in the data packets and forward the bits carrying information of the indication to the processor 302 for processing.

At block 804, the method 800 may generate an application identifier corresponding to the application and the flight configuration information. For example, the management component 356 may generate an application identifier, such as a Project ID, for the application 112 and the flight configuration information.

At block 806, the method 800 may receive a variable value request including a requestor identifier and an application identifier. For example, the communication component 352 of the server 120 may receive a first variable value request associated with the first token from the first device 102a and a second variable value request associated the second token from the second device 102b. The first token may be associated by the developer with the application identifier and with the first user 106a of the PremiumUserGroup and the second token may be associated with the second user 106b of the BetaTesterGroup. The tokens may be RPS tokens or AAD tokens. The first token may be encrypted and may include the identity of the first user 106a and/or the first device 102a. The second token may be encrypted and may include the identity of the second user 106b and/or the second device 102b. In some implementations, the device or user identifiers, which may be the tokens, may include the MAC addresses of the first and second devices 102a, 102b, the usernames/passwords of the first and second users 106a, 106b, and/or the email addresses of the first and second users 106a, 106b. The variable value request may include an application identifier identifying the application 112, which enables the server to match the variable value request to flight configurations for the identified application. In some implementations, the modem 308 may transmit the identifiers in data packets to the first and second devices 102a, 102b. In some implementations, the modem 308 may receive data packets carrying information of the requests.

At block 808, the method 800 may correlate the request application identifier to the application identifier of the application. For example, the correlation component 358 may identify the application identifier in the variable request and correlate the identified application identifier with the application identifier of the application 112.

At block 810, the method 800 may correlate the requestor identifier to the first flight group and the first variable value or the second flight group and the second variable value based on the request application identifier correlating to the application identifier of the application. For example, the correlation component 358 may correlate the requestor identifier to the PremiumUserGroup and the value PremiumLevels or the BetaTesterGroup and the value TestLevels based on the request application identifier correlating to the application identifier of the application 112.

At block 812, the method 800 may transmit a variable value response including the variable value information identifying the first variable value or the second variable value based on a result of the correlating of the request application identifier and the requestor identifier. For example, the communication component 352 of the server 120 may transmit the PremiumLevels value to the first device 102a and/or the TestLevels value to the second device 102b. In some implementations, the modem 308 may decode the requests packets from block 808 and forward the request to the processor 302. The processor 302 may access the memory 304 for the stored information relating to the identified application, the configured flight information including flight groups and variable values, and forward the stored information or at least identification of the variable values to the modem 308. The modem 308 may encode the information of the variable values in data packets, and transmit the information to the first and second devices 102a, 102b.

As used in this application, the terms "device," "component," "system," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device, which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any example described herein as "exemplary" is not necessarily to be construed as preferred or advantageous over other examples. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this application that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various examples or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium, which includes a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present application have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method of operating a device, comprising:
   executing a single binary code version of an application including an application identifier, a first set of code of the single binary code version of the application for providing a first experience and a second set of code of the single binary code version of the application for providing a second experience, wherein the first set of code is associated with a first variable value of a variable in the application, and the second set of code is associated with a second variable value of the variable in the application;

obtaining a requestor identifier associated with the device or a user of the device;

transmitting a variable value request including the requestor identifier and the application identifier via an application programming interface to a portal, the variable value request requesting variable value information relating to the variable of the application associated with the requestor identifier;

receiving a variable value response including the variable value information relating to the variable associated with the requestor identifier, wherein the variable value information identifies one of the first variable value or the second variable value;

executing the first set of code to provide the first experience within the application based on the variable value information identifying the first variable value; and executing the second set of code to provide the second experience within the application based on the variable value information identifying the second variable value.

2. The method of claim 1, wherein the transmitting the variable value request and receiving the variable value response occurs during a run-time of the application.

3. The method of claim 1, wherein the first variable value and the second variable value are associated with different flight groups identified within the portal.

4. The method of claim 1, wherein executing the first set of code to provide the first experience comprises providing a first feature of the application, and executing the second set of code to provide the second experience comprises providing a second feature of the application different from the first feature.

5. The method of claim 1, wherein the single binary code version of the application includes a plurality of variables each having a plurality of sets of code corresponding to one of a plurality of variable values, and wherein receiving the variable value response including the variable value information comprises receiving respective variable values for each of the plurality of variables, and executing the corresponding one of each of the plurality of sets of code.

6. The method of claim 1, wherein receiving the variable value response including the variable value information comprises receiving initial variable value information, and further comprising performing a subsequent executing of the single binary code version of the application, transmitting a subsequent variable value request, and receiving a subsequent variable value response including subsequent variable value information, wherein the subsequent variable value information identifies a different variable value than the initial variable value information.

7. A device, comprising:
a memory; and
one or more processors communicatively coupled to the memory, the one or more processors are configured to:
execute a single binary code version of an application including an application identifier, a first set of code of the single binary code version of the application for providing a first experience and a second set of code of the single binary code version of the application for providing a second experience, wherein the first set of code is associated with a first variable value of a variable in the application, and the second set of code is associated with a second variable value of the variable in the application;

obtain a requestor identifier associated with the device or a user of the device;

transmit a variable value request including the requestor identifier and the application identifier via an application programming interface to a portal, the variable value request requesting variable value information relating to the variable of the application associated with the requestor identifier;

receive a variable value response including the variable value information relating to the variable associated with the requestor identifier, wherein the variable value information identifies one of the first variable value or the second variable value;

execute the first set of code to provide the first experience within the application based on the variable value information identifying the first variable value; and execute the second set of code to provide the second experience within the application based on the variable value information identifying the second variable value.

8. The device of claim 7, wherein the transmitting the variable value request and receiving the variable value response occurs during a run-time of the application.

9. The device of claim 7, wherein the first variable value and the second variable value are associated with different flight groups identified within the portal.

10. The device of claim 7, wherein executing the first set of code to provide the first experience comprises providing a first feature of the application, and executing the second set of code to provide the second experience comprises providing a second feature of the application different from the first feature.

11. The device of claim 7, wherein the single binary code version of the application includes a plurality of variables each having a plurality of sets of code corresponding to one of a plurality of variable values, and wherein receiving the variable value response including the variable value information comprises receiving respective variable values for each of the plurality of variables, and executing the corresponding one of each of the plurality of sets of code.

12. The device of claim 7, wherein receiving the variable value response including the variable value information comprises receiving initial variable value information, and further comprising performing a subsequent executing of the single binary code version of the application, transmitting a subsequent variable value request, and receiving a subsequent variable value response including subsequent variable value information, wherein the subsequent variable value information identifies a different variable value than the initial variable value information.

13. A computer-readable medium having instructions stored therein that, when executed by one or more processors, cause the one or more processors to:
execute a single binary code version of an application including an application identifier, a first set of code of the single binary code version of the application for providing a first experience and a second set of code of the single binary code version of the application for providing a second experience, wherein the first set of code is associated with a first variable value of a variable in the application, and the second set of code is associated with a second variable value of the variable in the application;

obtain a requestor identifier associated with the device or a user of the device;

transmit a variable value request including the requestor identifier and the application identifier via an application programming interface to a portal, the variable value request requesting variable value information relating to the variable of the application associated with the requestor identifier;

receive a variable value response including the variable value information relating to the variable associated with the requestor identifier, wherein the variable value information identifies one of the first variable value or the second variable value;

execute the first set of code to provide the first experience within the application based on the variable value information identifying the first variable value; and execute the second set of code to provide the second experience within the application based on the variable value information identifying the second variable value.

14. The computer-readable medium of claim 13, wherein the transmitting the variable value request and receiving the variable value response occurs during a run-time of the application.

15. The computer-readable medium of claim 13, wherein executing the first set of code to provide the first experience comprises providing a first feature of the application, and executing the second set of code to provide the second experience comprises providing a second feature of the application different from the first feature.

16. The computer-readable medium of claim 13, wherein the single binary code version of the application includes a plurality of variables each having a plurality of sets of code corresponding to one of a plurality of variable values, and wherein receiving the variable value response including the variable value information comprises receiving respective variable values for each of the plurality of variables, and executing the corresponding one of each of the plurality of sets of code.

17. The computer-readable medium of claim 13, wherein receiving the variable value response including the variable value information comprises receiving initial variable value information, and further comprising performing a subsequent executing of the single binary code version of the application, transmitting a subsequent variable value request, and receiving a subsequent variable value response including subsequent variable value information, wherein the subsequent variable value information identifies a different variable value than the initial variable value information.

18. A method of managing an application, comprising:
receiving flight configuration information from a developer of an application assigning a first variable value of a variable in the application to a first flight group having a first set of requestor identifiers and a second variable value of the variable to a second flight group having a second set of requestor identifiers, wherein the first variable value is associated with a first set of code of a single binary code version of the application executable to provide a first experience within the application and the second variable value is associated with a second set of code of the single binary code version of the application executable to provide a second experience within the application;

generating an application identifier corresponding to the application and the flight configuration information;

receiving a variable value request including a requestor identifier and a request application identifier;

correlating the request application identifier to the application identifier of the application;

correlating the requestor identifier to the first flight group and the first variable value or the second flight group and the second variable value based on the request application identifier correlating to the application identifier of the application;

transmitting a variable value response including variable value information identifying the first variable value or the second variable value, based on a result of the correlating of the request application identifier and the requestor identifier; and executing the first set of code to provide the first experience within the application based on the variable value information identifying the first variable value; and executing the second set of code to provide the second experience within the application based on the variable value information identifying the second variable value.

19. The method of claim 18, wherein the receiving the variable value request further includes receiving during a run-time of the application on a device.

20. The method of claim 18, further comprising receiving updated flight configuration information from the developer assigning at least a third variable value to at least one of the first flight group or the second flight group subsequent to receiving the variable value request.

* * * * *